United States Patent [19]
Abe et al.

[11] Patent Number: 6,027,806
[45] Date of Patent: Feb. 22, 2000

[54] EXPANDED RESIN BEADS

[75] Inventors: Tadashi Abe; Masaaki Yokoyama; Toshihiro Gotoh; Teruya Ohkuwa, all of Yokkaichi, Japan

[73] Assignee: Mitsubishi Chemical BASF Company Limited, Japan

[21] Appl. No.: 09/003,342

[22] Filed: Jan. 6, 1998

[51] Int. Cl.[7] .................................. B32B 5/16; C08J 3/34
[52] U.S. Cl. ..................... 428/407; 523/201; 523/207; 523/210
[58] Field of Search ............................ 428/407; 523/201, 523/207, 210

[56] References Cited

U.S. PATENT DOCUMENTS

| | | | |
|---|---|---|---|
| 4,455,344 | 6/1984 | Matsuyama et al. | 428/327 |
| 4,521,487 | 6/1985 | Mitsuno et al. | 428/407 |
| 4,652,609 | 3/1987 | DiGiulio | 525/242 |
| 4,661,388 | 4/1987 | DiGiulio | 428/35 |
| 4,970,118 | 11/1990 | Kresge et al. | 428/407 |
| 5,034,251 | 7/1991 | Read et al. | 428/34.9 |
| 5,053,441 | 10/1991 | Biale | 523/201 |
| 5,585,184 | 12/1996 | Baker et al. | 428/407 |
| 5,641,561 | 6/1997 | Hansen et al. | 442/417 |

FOREIGN PATENT DOCUMENTS

WO 96/15892  5/1996  WIPO .

*Primary Examiner*—Hoa T. Le
*Attorney, Agent, or Firm*—Nixon & Vanderhye

[57] ABSTRACT

The present invention relates to an expanded resin bead comprising:
  a core which comprises a crystalline thermoplastic resin and is in an expanded state, and
  a coat which comprises an ethylene-based polymer which is lower in melting point than said thermoplastic resin or shows substantially no melting point, and which coat is in a substantially unexpanded state.

10 Claims, No Drawings

EXPANDED RESIN BEADS

BACKGROUND OF THE INVENTION

The present invention relates to expanded resin beads. Particularly, the present invention relates to expanded resin beads having excellent fusion-bonding properties, therefore capable of lowering the molding temperature in production of in-molded articles and also capable of providing the molded products having excellent mechanical and thermal properties.

Expanded resin beads are used widely as molding material for a variety of molded products such as insulators, cushionings, cores, etc., because these resin beads are capable of assuming any desired shape and also low in heat conductivity due to their closed-cell structure. As thermoplastic resin constituting these expanded resin beads, polyethylene, polypropylene, polystyrene and the like are usually used.

In case where a high-melting point resin such as polypropylene-based resin is used for the expanded resin beads, however, high-pressure steam of over 2 kg/cm$^2$G (Gauge) is required for providing a pressure needed for conducting fusion-bonding of the expanded resin beads to each other during in-mold operations because the melting point of the said type of resin is usually not less than 135° C. The above molding condition causes the disadvantages such as increased molding cost and prolonged molding cycle. Also, in the case of the expanded resin beads composed of a high-melting point resin such as mentioned above, a molding machine of high clamping pressure equipped with a high-pressure steam control system is required because the said type of resin beads are incapable of molding with an in-mold expansion molding machine for expanded polystyrene which is now popularly used in the art.

On the other hand, polyethylene type resins, have an advantages in which the steam pressure required for mutual fusion-bonding of the expanded resin beads can be low (below 2 kg/cm$^2$G) because the melting point of the polyethylene type of resins is low (below 125° C.), and in which a molding machine for expanded polystyrene can be used with substantially no need of changing its specification. However, the expansion molded products of the polyethylene type resins are low in heat resistance because of low melting point of such resins, and especially the highly expanded molded articles are small in energy absorbing capacity. Therefore, practical application of the expansion molded products made from the polyethylene type resin has been limited to low-expansion uses, and there is a disadvantage of these products in comparison with the expansion molded articles made of other thermoplastic resins.

As a result of the present inventors' earnest studies to solve the above problems, it has been found that the expansion molded articles are phenomenally improved in mechanical and thermal properties by using expanded resin beads which comprise a core comprising a specific resin, the said core being in an expanded state, and a coat comprising a specific polymer, the said coat being in a substantially non-expanded state. The present invention has been attained on the basis of the above finding.

SUMMARY OF THE INVENTION

An object of the present invention is to provide expanded resin beads which are capable of providing a molding products having the same properties as obtained by other expansion molding articles, and having high heat resistance when the molding products is produced by using a molding machine of low clamping pressure.

To accomplish the aim, in an aspect of the present invention, there is provided an expanded resin bead comprising:
a core which comprises a crystalline thermoplastic resin and is in an expanded state, and
a coat which comprises an ethylene-based polymer which is lower in melting point than said thermoplastic resin or shows substantially no melting point, and which coat is in a substantially unexpanded state.

DETAILED DESCRIPTION OF THE INVENTION

The present invention is explained in more detail below.

The expanded resin bead according to the present invention has a composite structure comprising a core and a coat thereon. The core comprises a crystalline thermoplastic resin. Examples of the crystalline thermoplastic resins usable for the core include polypropylene-based resins, polybutene-based resins, polymethylpentene-based resins, polyester-based resins, polyamide-based resins, fluorine-based resins, and crystalline styrene-based resins. Among them, propylene homopolymer or random or block copolymers of propylene and α-olefins other than propylene.

The coat comprises an ethylene-based polymer which is lower in melting point than the said crystalline thermoplastic resin or shows substantially no melting point. Examples of such low-melting point ethylene-based polymers include high-pressure-processed low-density polyethylenes, linear low-density polyethylenes, linear ultralow-density polyethylenes, and copolymers of ethylene and vinyl acetate, unsaturated carboxylic acid esters, unsaturated carboxylic acids, vinyl alcohol or the like.

Examples of the said ethylene-based polymers showing substantially no melting point include rubbers and elastomers such as ethylene propylene rubber, ethylene propylene diene rubber, ethylene acrylic rubber, chlorinated polyethylene rubber and chlorosulfonated polyethylene rubber. These ethylene-based polymers may be used either singly or as a mixture of two or more of them.

As the above ethylene-based polymers, high-pressure-processed low-density polyethylenes, linear low-density polyethylenes and linear ultralow-density polyethylenes are preferred. Among them, linear low-density polyethylenes and linear ultralow-density polyethylenes polymerized by using a metallocene catalyst are especially preferred. In the present invention, an ethylene-based polymer composition comprising an ethylene-based polymer and a crystalline thermoplastic resin of the same type as used for the core is also suited for forming the coat. Use of such an ethylene-based polymer composition has an advantage of improving adhesion between the core and its coat.

In the present invention, the amount of the said crystalline thermoplastic resin used is usually 1 to 100 parts by weight based on 100 parts by weight of the ethylene-based polymer. When the ratio of the thermoplastic resin exceeds 100 parts by weight, the sea-and-island structure of the coat varies, causing the crystalline thermoplastic resin to constitute a continuous sea phase, so that the in-mold steam pressure can not be reduced significantly. The preferred amount of the thermoplastic resin is 1 to 50 parts by weight based on 100 parts by weight of the ethylene-based polymer.

In the present invention, it is preferable to select an ethylene-based polymer whose melting point is at least 15°

C. lower than the crystalline thermoplastic resin constituting the core. The difference in melting point between the ethylene-based polymer used for the coat and the crystalline thermoplastic resin used for the core is preferably 20 to 60° C., more preferably 20 to 40° C. When the said difference in melting point is less than 15° C., there is a risk of causing expansion of the coat comprising an ethylene-based polymer under the conditions in which the crystalline thermoplastic resin of the core is expanded.

Further, in the present invention, the melting point of the said ethylene-based polymer is usually not more than 125° C., preferably 100 to 125° C. When using an ethylene-based polymer whose melting point exceeds 125° C., the steam pressure required for molding the expanded resin beads tends to elevate.

In the expanded resin bead according to the present invention, the thickness of the coat is usually 1 to 150 μm, preferably 10 to 100 μm. When the thickness of the coat is less than 1 μm, the reduction of steam pressure required during molding may be insufficient. On the other hand, when the coat thickness exceeds 150 μm, although it is possible to lower steam pressure for molding, the percentage of the substantially unexpanded portion of the coat increases, resulting in a low mechanical strength of the molded product for the expansion degree.

The expanded resin bead according to the present invention can basically be produced by impregnating a volatile expanding agent in a composite structural bead comprising a core comprising a crystalline thermoplastic resin and a coat thereon comprising an ethylene-based polymer which is lower in melting point than the said crystalline thermoplastic resin or shows substantially no melting point, and expanding the thus impregnated composite structural bead by heating.

As the said volatile expanding agent, there can be used, for instance, lower aliphatic hydrocarbons such as propane, butane, pentane, heptane, cyclopentane and cyclohexane, halogenated hydrocarbons such as dichlorodifluoromethane and trichloromonofluoromethane, and inorganic gases such as nitrogen, air and carbon dioxide. These expanding agents may be used either singly or as a combination of two or more of them.

Various methods are available for producing the composite structural beads used as starting material of the expanded resin beads of the present invention. For example, a sheathed core-type composite die such as disclosed in Japanese Patent Publication (KOKOKU) Nos. 41-16125, 43-23858 and 44-29522 and Japanese Patent Application Laid-Open (KOKAI) No. 60-185816 can be used. In this case, two sets of extruder are used, with one of them being used for melting and kneading the crystalline thermoplastic resin constituting the core and the other extruder being used for melting and kneading the ethylene-based polymer composition constituting the coat, and the said two materials are discharged out from the die into a sheathed core type composite body with the said crystalline thermoplastic resin forming the core and the said ethylene-based polymer composition forming the coat.

Then the thus obtained composite body is cut to obtain composite beads having weight of 0.1 to 10 mg. When the individual bead weight is less than 0.1 mg, the expansion molded articles obtained from these beads may lower in mechanical strength because the percentage of the coat which serves for effectively reducing steam pressure required for molding work is increased. On the other hand, when the bead weight exceeds 10 mg, filling of the mold with the beads tends to deteriorate.

As methods for heating and expanding the said sheathed core-type composite beads impregnated with a volatile expanding agent, there can be used, for instance, the methods described in Japanese Patent Publication (KOKOKU) Nos. 49-2183 and 56-1344, German Patent Nos. 1,285,722A and 2,107,683A, etc.

According to these methods, the sheathed core type composite beads are put into a closed vessel together with a volatile expanding agent and heated to a temperature above the softening point of the crystalline thermoplastic resin comprising the core, so that the said composite beads are impregnated with the volatile expanding agent. Thereafter, the contents of the closed vessel are released into an atmosphere lower in pressure than the inside of the closed vessel and then dried to obtain the expanded resin beads of the present invention.

The heating temperature for the expansion of the composite beads is usually set to be not lower than the softening point of the crystalline thermoplastic resin of the core, but preferably a temperature higher than the melting point of the ethylene-based polymer forming the coat (the melting point of the principal component in the case of a composition) is selected. In the present invention, an agitator is incorporated in the production system to prevent the composite beads in the vessel from being fusion-bonded to each other.

It is preferred to use water, an alcohol or the like as a dispersing medium for the composite beads when they are expanded by heating. Also, to facilitate uniform dispersion of the composite beads in the dispersing medium, it is preferred to use a sparingly water-soluble inorganic material such as aluminum oxide, calcium tertiary phosphate, magnesium pyrophosphate and zinc oxide, a water-soluble protective colloid such as polyvinyl pyrrolidone, polyvinyl alcohol and methyl cellulose, or an anionic surfactant such as sodium dodecylbenzenesulfonate and sodium α-olefinesulfonate. These substances may be used either singly or as a mixture of two or more of them.

When the composite beads are released into a low-pressure atmosphere, it is preferable to introduce an inorganic gas or a volatile expanding agent such as mentioned above into the closed vessel from the outside to keep the pressure in the vessel constant so as to facilitate such release of the beads.

The expanded resin beads of the present invention can be molded into products by using various types of mold and molding method. For instance, molding may be conducted according to a compression molding method (such as described in Japanese Patent Publication (KOKOKU) No. 46-38359) in which the expanded resin beads are charged into the mold cavity comprising female and male molds under atmospheric or reduced pressure, then the mold is compressed to reduce the volume of the cavity by 5 to 70% and a heating medium such as steam is introduced into the cavity to make the expanded resin beads fusion-bonded to each other.

It is also possible to employ a pressure aging method (such as described in Japanese Patent Publication (KOKOKU) No. 51-22951) in which the expanded resin beads are first treated with one or more types of volatile expanding agent or inorganic gas to elevate the secondary expanding force of the resin beads; then with their elevated secondary expanding force maintained, the beads are filled in the mold cavity under atmospheric or reduced pressure; and then a heating medium is introduced into the cavity to conduct fusion-bonding between the individual beads.

It is further possible to conduct a compression filling method (such as described in Japanese Patent Publication (KOKOKU) No. 4-46217) in which the mold cavity pressurized above the atmospheric pressure by a compressed gas is filled with the expanded resin beads which have been pressurized to a higher level than the cavity, and then a heating medium is introduced into the cavity to fusion-bond the resin beads.

There can also be conducted a normal pressure filling method (such as described in Japanese Patent Publication (KOKOKU) No. 6-49795) in which the expanded resin beads with high secondary expanding force obtained by a treatment under the specific conditions are charged into the mold cavity defined by the top force and the bottom plug under atmospheric or reduced pressure, and then a heating medium such as steam is introduced into the cavity to conduct fusion-bonding of the beads. Any of the above-described methods or a combination of these methods (such as described in Japanese Patent Publication (KOKOKU) No. 6-22919) may be conducted for molding in the present invention.

In case where any of the above-described methods is used, the pressure required for conducting fusion-bond is preferably less than 2 kg/cm²G.

In the expanded resin bead according to the present invention, as seen from its cut section, the crystalline thermoplastic resin of the core assumes an expanded state of a closed-cell structure while the ethylene-based polymer forming the coat is in a substantially non-expanded film-like state.

According to the present invention, it is possible to produce a molded product comprising the said expanded resin beads effectively fusion-bonded to each other under a low steam pressure by any of the above-mentioned molding methods.

According to the present invention, the mold dimensional shrinkage of the mold product to the cavity is usually not more than 2.5%.

The molded products obtained in the manner described above have excellent mechanical strength and high heat resistance and are, therefore, suited for use as a heat insulator, structural component, core and the like.

As explained above, the expanded resin beads of the present invention show excellent fusion-bonding properties even if the hot steam pressure in in-mold operation is low, and the molded products obtained from these resin beads have high mechanical strength and high heat resistance.

EXAMPLES

The present invention is explained in more detail by the following examples. It should be recognized, however, that these examples are merely intended to be illustrative and not to be construed as limiting the scope of the invention. In the following Examples, the properties of the beads and the molded products were determined in the following ways.
<Melting Point>

The measurements were conducted by a differential scanning calorimeter (DSC). First, 3 to 5 mg of the resin sample, was heated to a temperature at which the resin crystals melted, and then cooled to room temperature at a rate of 10° C./min. Then the sample was again heated at a rate of 10° C./min and the peak temperature of the obtained endothermic curve was indicated as melting point of the resin sample.
<Fusion-bonding Test>

There were prepared the 200 mm×30 mm×12.5 mm thick test specimens from each molded product. These specimens were bent to 90° along the circumference of a 50 mm-diameter cylinder and their quality was evaluated according to the following criterion.

○: 80% or more of the total number of the test specimens remained uncracked.

X: More than 20% of the total number of the test specimens cracked.

In the present invention, it is preferable that the above evaluation is ○.
<Heat Resistance Test>

The percentage of dimensional change at 110° C. was measured according to JIS K 6767 and evaluated according to the following criterion.

○: Dimensional shrinkage was less than 3%.

Δ: Dimensional shrinkage was 3 to 6%.

X: Dimensional shrinkage exceeded 6%.

In the present invention, it is preferable that the above evaluation is ○ or Δ.

Example 1

An ethylene-propylene random copolymer (melting point: 153° C.) was kneaded by a 40 mm-inner diameter single-screw extruder while a linear low-density polyethylene (melting point: 123° C.; density: 0.920) was kneaded by a 25 mm-inner diameter single-screw extruder. The kneaded materials were extruded from a 1.5 mm-diameter die orifice into a strand with its core portion being formed by the ethylene-propylene random copolymer and the coat being formed by the linear low-density polyethylene.

This strand was cooled by passing it through a water tank and then cut into 1.2 mg pieces. The thus obtained composite beads were cut along a section and the cut sections were observed through a phase-contrast microscope, which showed that the core ethylene-propylene random copolymer was coated with the linear low-density polyethylene to a thickness of 30 μm.

100 parts of these composite beads, 250 parts of water, 1.0 part of calcium tertiary phosphate having a particle size of 0.3 to 0.5 μm and 0.007 part of sodium dodecylbenzene-sulfonate were fed into a closed vessel, followed by supply of 20 parts of butane under stirring. The materials were filled in the vessel to a filling percentage of 62%, then heated to 145° C. over a period of one hour and kept at the same temperature for 30 minutes.

Then the valve of the discharge port at the bottom of the closed vessel was opened and nitrogen gas was introduced into the gaseous phase section in the vessel from the outside. With the pressure in the vessel maintained, the contents of the vessel were released into the atmosphere to obtain the objective expanded resin beads. The thus obtained expanded resin beads had an average bulk density of 17 kg/m³ and an average foam diameter of 120 μm, and there was seen no blocking between the individual beads.

A phase-contrast microscopical observation of the cut sections of the obtained expanded resin beads showed that the ethylene-propylene random copolymer forming the core was in an expanded state forming a closed-cell structure while the linear low-density polyethylene was in a substantially unexpanded film-like state and coated the expanded body of the ethylene-propylene random copolymer.

These expanded resin beads were perfectly dried in a drying chamber of 40° C. and pressurized by compressed air of 2.0 kg/cm²G. The shrunk beads were filled in the cavity of an aluminum mold comprising female and male molds and having a steam hole, the said cavity being under an atmosphere pressurized by compressed air of 1.5 kg/cm²G. Then steam of 1.0 kg/cm²G was introduced into the cavity to make the beads fusion-bonded to each other.

The fused beads were subjected to 20-second water cooling and 35-second air drying, and at a point when the face pressure of the mold became 0.3 kg/cm²G, the mold was opened to take out the molded product. This molded product had a density of 30 kg/cm³ and measured 200 mm×300 mm×25 mm, and its dimensional shrinkage relative to the mold was 1.9%.

20 test pieces, each measuring 200 mm×30 mm×12.5 mm, were prepared from the above molded product, and each test piece was wound round a 50 mm-diameter cylinder and bent to 90°. As a result, more than 80% of the test pieces remained unbroken. A 50 mm×50 mm×25 mm thick test piece was prepared from another molded product obtained under the same molding conditions as described above, and it was subjected to a compression test according to JIS K 6767. As a result, it showed a 50% compression stress of 2.9 kg/cm². When it was further subjected to a 110° C. heat resistance test according to JIS K 6767, its dimensional shrinkage was less than 3%. These test results are shown collectively in Table 3.

Examples 2 to 9 and Comparative Examples 1 to 9

The same procedure as defined in Example 1 was conducted except that the expanded resin beads specified in Tables 1 to 6 were used, and that expansion and molding were conducted under the conditions shown in Tables 1 to 5. The results are shown in Tables 1 to 5. It was found that the expanded resin beads according to the present invention and the molded products thereof had excellent fusion-bonding properties, high mechanical strength and high heat resistance.

TABLE 1

| | Example 1 | Example 2 | Example 3 | Example 4 |
|---|---|---|---|---|
| Core resin | ET-PR | ET-PR | ET-PR | ET-PR |
| ET content (%) | 1.5 | 1.5 | 1.5 | 3.5 |
| Melting point (° C.) | 153 | 153 | 153 | 142 |
| Coat resin | LLDPE | LLDPE | ET-VAC(5) | LLDPE |
| Density | 0.920 | 0.920 | — | 0.920 |
| Melting point (° C.) | 123 | 123 | 102 | 123 |
| Coat thickness (μm) | 30 | 100 | 8 | 30 |
| Composite bead weight (mg) | 1.2 | 7.0 | 0.5 | 1.2 |
| Average bulk density (kg/m³) | 17 | 20 | 19 | 17 |
| Core condition | Closed-cell | Closed-cell | Closed-cell | Closed-cell |
| Coat condition | Substantially unexpanded | Substantially unexpanded | Substantially unexpanded | Substantially unexpanded |
| Molding steam pressure (kg/cm²G) | 1.0 | 1.0 | 1.5 | 1.0 |
| Molded product density (kg/m³) | 30 | 35 | 30 | 30 |
| Mold dimensional shrinkage (%) | 1.9 | 2.1 | 1.8 | 1.9 |
| Fusion-bonding test | ◯ | ◯ | ◯ | ◯ |
| Compression test (kg/cm²) | 2.9 | 3.1 | 3.t | 2.6 |
| Heat resistance test | ◯ | Δ | ◯ | Δ |

ET-PR: ethylene-propylene random copolymer
LLDPE: linear low-density polyethylene
ET-VAC(5): ethylene-vinyl acetate (5%) copolymer (The above abbreviations are also used in the following tables.)

TABLE 2

| | Example 5 | Example 6 | Example 7 |
|---|---|---|---|
| Core resin | PR | 1BT-PR | 1BT-PR |
| 1BT content (%) | 0 | 2.5 | 2.5 |
| Melting point (° C.) | 161 | 156 | 156 |
| Coat resin | ET-VAC(5) | LLDPE | LLDPE |
| Density | — | 0.920 | 0.905 |
| Melting point (° C.) | 102 | 123 | 101 |
| Coat thickness (μm) | 20 | 30 | 30 |
| Composite bead weight (mg) | 1.2 | 1.5 | 1.2 |
| Average bulk density (kg/m³) | 16 | 15 | 17 |
| Core condition | Closed-cell | Closed-cell | Closed-cell |
| Coat condition | Substantially unexpanded | Substantially unexpanded | Substantially unexpanded |
| Molding steam pressure (kg/cm²G) | 0.8 | 1.0 | 1.5 |
| Molded product density (kg/m³) | 28 | 25 | 30 |
| Mold dimensional shrinkage (%) | 1.9 | 1.8 | 1.9 |
| Fusion-bonding test | ◯ | ◯ | ◯ |
| Compression test (kg/cm²) | 3.4 | 2.9 | 3.4 |
| Heat resistance test | ◯ | ◯ | ◯ |

PR: propylene homopolymer
1BT-PR: 1-butene-propylene random copolymer
(The above abbreviations are also used in the following tables.)

TABLE 3

| | Comp. Example 1 | Comp. Example 2 | Comp. Example 3 | Comp. Example 4 |
|---|---|---|---|---|
| Core resin | ET-PR | ET-PR | 1BT-PR | 1BT-PR |
| ET content or 1BT content (%) | 1.5 | 1.5 | 2.5 | 2.5 |
| Melting point (° C.) | 153 | 153 | 156 | 156 |
| Coat resin | — | — | — | — |
| Density | — | — | — | — |
| Melting point (° C.) | — | — | — | — |
| Coat thickness (μm) | — | — | — | — |
| Composite bead weight (mg) | 1.2 | 1.2 | 1.5 | 1.5 |
| Average bulk density (kg/m³) | 17 | 17 | 15 | 15 |
| Core condition | Closed-cell | Closed-cell | Closed-cell | Closed-cell |
| Coat condition | — | — | — | — |
| Molding steam | 1.0 | 5.0 | 1.0 | 4.5 |

TABLE 3-continued

|  | Comp. Example 1 | Comp. Example 2 | Comp. Example 3 | Comp. Example 4 |
|---|---|---|---|---|
| pressure (kg/cm²G) |  |  |  |  |
| Molded product density (kg/m³) | 30 | 30 | 25 | 25 |
| Mold dimensional shrinkage (%) | 1.6 | 2.2 | 1.6 | 1.8 |
| Fusion-bonding test | × | ○ | × | ○ |
| Compression test (kg/cm²) | Unmeasurable | 3.2 | Unmeasurable | 3.2 |
| Heat resistance test | Unmeasurable | ○ | Unmeasurable | ○ |

TABLE 4

|  | Comp. Example 5 | Comp. Example 6 | Comp. Example 7 | Comp. Example 8 |
|---|---|---|---|---|
| Core resin | ET-PR | ET-PR | ET-PR | LLDPE |
| ET content (%) | 1.5 | 1.5 | 1.5 | — |
| Melting point (° C.) | 153 | 153 | 153 | 123 |
| Coat resin | LLDPE | LLDPE | ET(3.5)-PR | — |
| Density | 0.920 | 0.920 | — | — |
| Melting point (° C.) | 123 | 123 | 142 | — |
| Coat thickness (μm) | 200 | 0.8 | 30 | — |
| Composite bead weight (mg) | 7.0 | 0.5 | 1.2 | 3.0 |
| Average bulk density (kg/m³) | 20 | 19 | 17 | 17 |
| Core condition | Closed-cell | Closed-cell | Closed-cell | Closed-cell |
| Coat condition | Substantially unexpanded | Substantially unexpanded | Open cell | — |
| Molding steam pressure (kg/cm²G) | 1.0 | 1.5 | 1.3 | 0.8 |
| Molded product density (kg/m³) | 35 | 30 | 32 | 30 |
| Mold dimensional shrinkage (%) | 2.6 | 1.6 | 2.9 | 1.9 |
| Fusion-bonding test | ○ | × | × | ○ |
| Compression test (kg/cm²) | 2.2 | Unmeasurable | Unmeasurable | 1.7 |
| Heat resistance test | × | Unmeasurable | Unmeasurable | × |

ET(3.5)-PR: ethylene (3.5%)-propylene random copolymer (The above abbreviation is also used in the following table.)

TABLE 5

|  | Example 8 | Comp. Example 9 | Example 9 |
|---|---|---|---|
| Core resin | ET-PR | ET-PR | ET-PR |
| ET content (%) | 1.5 | 1.5 | 1.5 |
| Melting point (° C.) | 153 | 153 | 153 |
| Coat resin | Composition A | Composition B | M-LLDPE |
| Density | 0.920 | 0.920 | — |
| Melting point (° C.) | 123 | 123 | 102 |
| Coat thickness (μm) | 30 | 30 | 30 |
| Composite bead weight (mg) | 1.2 | 1.2 | 1.2 |
| Average bulk density (kg/m³) | 17 | 17 | 17 |
| Core condition | Closed-cell | Closed-cell | Closed-cell |
| Coat condition | Substantially unexpanded | Closed-cell | Substantially unexpanded |
| Molding steam pressure (kg/cm²G) | 1.2 | 1.2 | 0.8 |
| Molded product density (kg/m³) | 30 | 30 | 30 |
| Mold dimensional shrinkage (%) | 1.7 | 1.7 | 1.8 |
| Fusion-bonding test | ○ | × | ○ |
| Compression test (kg/cm²) | 3.1 | Unmeasurable | 2.9 |
| Heat resistance test | ○ | Unmeasurable | ○ |

M-LLDPE: linear low-density polyethylene polymerized by using a metallocene catalyst (density: 0.895; melting point: 91° C.)
Composition A: 100 parts of linear low-density polyethylene (density: 0.920; melting point: 123° C.) 20 parts of ethylene (1.5%)-propylene random copolymer (melting point: 153° C.)
Composition B: 100 parts of linear low-density polyethylene (density: 0.920; melting point: 123° C.) 150 parts of ethylene (1.5%)-propylene random copolymer (melting point: 153° C.)

What is claimed is:

1. An expanded resin bead comprising:

a core which comprises a crystalline thermoplastic resin and is in an expanded state having a closed-cell structure, and surrounding the core a coat which comprises an ethylene-based polymer which is lower in melting point than said thermoplastic resin or shows substantially no melting point, and which coat is in a substantially unexpanded state.

2. An expanded resin bead according to claim 1, wherein said coat comprises a composition produced by blending 1 to 100 parts by weight of the same crystalline thermoplastic resin as used for the core with 100 parts by weight of an ethylene-based polymer.

3. An expanded resin bead according to claim 1, wherein said ethylene-based polymer a melting point of at least 15° C. less than that of the crystalline thermoplastic resin.

4. An expanded resin bead according to claim 1, wherein the melting point of the ethylene-based polymer is not more than 125° C.

5. An expanded resin bead according to claim 1, wherein the thickness of the coat is 1 to 150 μm.

6. An expanded resin bead according to claim 1, wherein the weight of the bead is 0.1 to 10 mg.

7. An expanded resin bead according to claim 1, which is obtained by (1) impregnating a composite bead which comprises a core comprising a crystalline thermoplastic resin in its expanded state having a closed cell structure and a coat comprising an ethylene-based polymer which is lower in melting point than said thermoplastic resin or shows substantially no melting point, with a volatile expanding agent; and then (2) heating the impregnated composite bead to expand the thermoplastic resin in the core into a closed-cell structure.

8. An expanded resin bead according to claim 1, wherein the pressure required for fusion bonding said resin beads is less than 2 kg/cm$^2$G.

9. A molding product produced by expansion-molding the expanded resin bead as defined in claim 1.

10. A process for producing a molded product comprising expansion molding the expanded resin beads of claim 1.

* * * * *